United States Patent [19]

Yeh

[11] Patent Number: 4,870,036

[45] Date of Patent: Sep. 26, 1989

[54] HIGH STRENGTH SILICON NITRIDE

[75] Inventor: Hun C. Yeh, Rancho Palos Verdes, Calif.

[73] Assignee: Allied-Signal Inc., Phoenix, Ariz.

[21] Appl. No.: 165,659

[22] Filed: Mar. 8, 1988

[51] Int. Cl.[4] ............................................. C04B 35/58
[52] U.S. Cl. ....................................... 501/97; 501/98; 501/152
[58] Field of Search ............................ 501/97, 98, 152

[56] References Cited

U.S. PATENT DOCUMENTS

| | | | |
|---|---|---|---|
| 4,134,947 | 1/1979 | Oda et al. | 501/98 X |
| 4,264,548 | 4/1981 | Ezis . | |
| 4,535,063 | 8/1985 | Matsuhiro et al. | 501/97 |
| 4,605,440 | 8/1986 | Halverson et al. . | |
| 4,605,634 | 8/1986 | DeAngelis . | |
| 4,607,017 | 8/1986 | Wolfe et al. . | |
| 4,608,354 | 8/1986 | Avella et al. . | |
| 4,609,633 | 9/1986 | Fukuhara et al. | 501/97 |
| 4,612,296 | 9/1986 | Sakamoto et al. . | |
| 4,612,297 | 9/1986 | Kasai et al. . | |
| 4,615,990 | 10/1986 | Richon et al. . | |
| 4,619,905 | 10/1986 | Natansohn et al. . | |
| 4,623,498 | 11/1986 | Beckwith et al. . | |
| 4,626,516 | 12/1986 | Morelock . | |
| 4,627,815 | 12/1986 | Aldinger et al. . | |
| 4,628,039 | 12/1986 | Mizutani et al. | 501/97 |
| 4,629,707 | 12/1986 | Wolfe . | |
| 4,632,910 | 12/1986 | Lee et al. . | |
| 4,640,899 | 2/1987 | Hillig et al. . | |
| 4,640,902 | 2/1987 | Lange . | |
| 4,640,903 | 2/1987 | Matsuhiro et al. . | |
| 4,642,298 | 2/1987 | Kuramoto et al. . | |
| 4,692,419 | 9/1987 | Matsui et al. | 501/97 |
| 4,692,420 | 9/1987 | Oda et al. | 501/97 |
| 4,746,636 | 5/1988 | Yokoyama | 501/97 |

OTHER PUBLICATIONS

Strength and Microstructure of Sintered $Si_3N_4$ with Rare-Earth-Oxide Additions, (W. Sanders & D. Mieskowski), NASA Lewis Research Center, Cleveland, OH 44135.

Characteristics of $Si_3N_4$-$SiO_2O_3$ Compositions Sintered in High Pressure Nitrogen (W. Sanders & T. Herbell), NASA Lewis Research Center, Cleveland, Ohio 44135.

Reliability of Two Sintered Silicon Nitride Materials, (David M. Mieskowski, W. Sanders & L. A. Pierce), NASA, Lewis Research Center, Cleveland, Ohio 44135.

Primary Examiner—William R. Dixon, Jr.
Assistant Examiner—Karl Group
Attorney, Agent, or Firm—R. Steven Linne; James W. McFarland

[57] ABSTRACT

An improved silicon nitride material characterized by high mechanical strength at high temperatures comprising a combination of approximately 0.5-6.0% by weight of strontium oxide, 2.0-12% by weight of yttrium oxide and the balance silicon nitride. The improved material is densified by either an encapsulated hot isostatic pressing method or an encapsulated sinter/HIP method and can be utilized to form near net shape articles.

14 Claims, 1 Drawing Sheet

HIGH STRENGTH SILICON NITRIDE

This invention was made with Government support under Contract No. NAS3-24385 awarded by the National Aeronautics and Space Administration. The government has certain rights in this invention.

BACKGROUND OF THE INVENTION

The present invention relates to a dense silicon nitride material having a novel composition and, in particular, relates to an improved silicon nitride material incorporating strontium carbonate, as a green state material, and yttrium oxide which are used as sintering aids to produce the dense silicon nitride material having high strength over a wide range of temperatures.

Sintered silicon nitride materials are well-known in the art. However, silicon nitride materials are usually limited in that the materials do not exhibit high strength and long stress rupture life when utilized in a high temperature (greater than 1000° C.) environment. It is known that sintering aids have been utilized in order to increase the density of the sintered material which in turn increases the mechanical strength. It is also known that the incorporation of yttrium oxide ($Y_2O_3$) is and remains one of the most utilized sintering aids to increase the properties of sintered silicon nitride materials. Furthermore, it is known to use strontium oxide (SrO) as a sintering aid with silicon nitrides, however, strontium oxide is unstable and reacts with the atmosphere and therefore degrades prior to the final formation of the silicon nitride material. In addition, strontium oxide is much more expensive than strontium carbonate which is stable.

SUMMARY OF THE PRESENT INVENTION

It is therefore an object of the present invention to produce a dense silicon nitride material which has improved mechanical strength and stress rupture life at high temperatures.

It is another object of the present invention to produce a silicon nitride material which has been processed using an appropriate combination of strontium carbonate and yttrium oxide as starting sintering aids.

More specifically, in accordance with the present invention, there is provided a densified silicon nitride having a final composition comprising (i) 82.0–97.5% silicon nitride (ii) 0.5–6.0% of strontium oxide and (iii) 2.0 to 12.0% of yttrium oxide. The silicon nitride is made by mixing the three constituents; silicon nitride, yttrium oxide and strontium carbonate along with an appropriate organic binder, if necessary, for forming the shape. The article can then be formed by any appropriate method such as hot pressing, cold isostatic pressing, injection molding, extrusion, uniaxial diepressing or slip casting. Thereafter, the article is thermally treated in a vacuum in order to decompose the strontium carbonate into carbon dioxide and strontium oxide. The article is then cooled to room temperature in the vacuum then stored in a low humdity environment such as a dessicator which keeps the article from contacting moisture. Densification by hot isostatic pressing is achieved by encapsulating the article in a metal (e.s. Nb) can under vacuum utilizing electron beam welding or other encapsulation technique, and heating to a temperature greater than 1600° C. in an inert atmosphere while pressurized to 192.9 MPa (28 KSI) (hot isostatically pressed) before cooling to room temperature and ambient pressure. The article can also be hot isostatically pressed to high density using other encapsulants such as high temperature glass frit systems. In addition, the article can also be densified by sinter/hot isostatic pressing process which eliminates the need to use an encapsulant.

DETAILED DESCRIPTION OF THE PREFERRED EMBODIMENT

Figure 1:
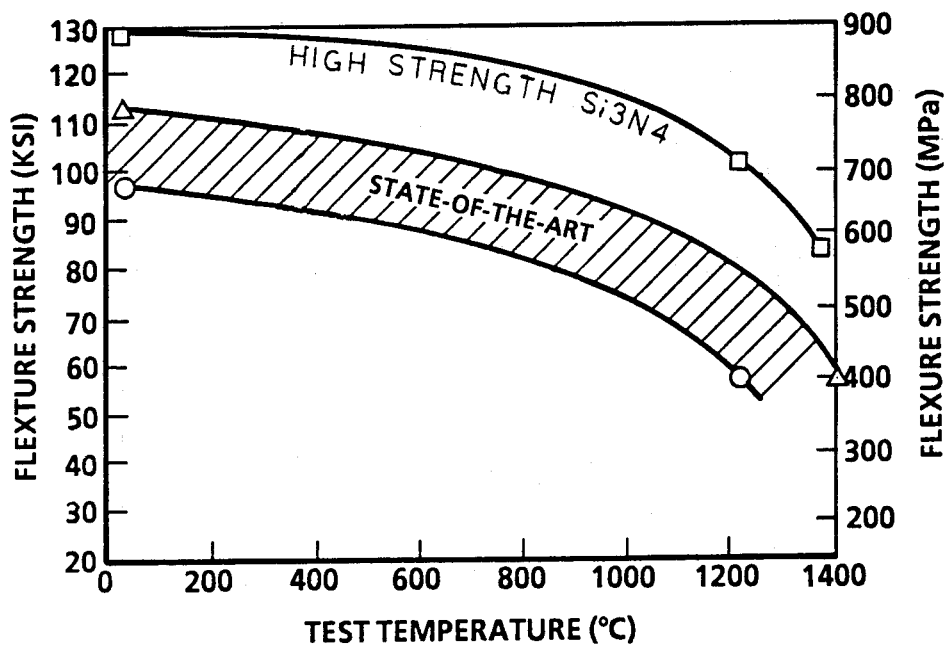

According to the present invention, a family of dense silicon nitride materials are prepared from mixtures comprising silicon nitride, yttrium oxide and strontium carbonate. The mechanical characteristics of the silicon nitride material is improved in that a dense body which is made from approximately 0.5–6.0 wt. % of strontium oxide (after conversion from strontium carboante) 2.0–12.0 wt.% yttrium oxide, and the balance silicon nitride is highly densified and has an improved mechanical flexure strength at high temperatures. FIG. 1 compares the flexural strength of one of the improved silicon nitride materials (8 wt.% $Y_2O_3$, 2 wt.% SrO and 90 wt. % $Si_3N_4$ densified by Nb encapsulation) with the state of the art silicon nitrides. This densified silicon nitride has the flexural strength and other typical properties shown in Table I. As shown within FIG. 1, the improved silicon nitride has significantly higher flexural strength over a range of temperatures.

TABLE I

| NEW HIGH TEMPERATURE $Si_3N_4$* (Densified by Nb Encapsulation/HIP) PROPERTY | |
|---|---|
| Property | Measured Value |
| 4-point flexural strength, MPa (KSI)–temperature °C. | 889.5 (129.1)–22° C., 706.7 (102.5)–1232° C., 580.8 (84.3)–1399° C. |
| Young's Modulus, GPA | 306.000 |
| Shear Modulus, GPA | 120.00 |
| Hardness, KG/$MM^2$ | 1405 |
| Fracture Toughness, MPa $M^{\frac{1}{2}}$ (Indentation Method) | 5.54 |
| Thermal Expansion COEF, (Cm/Cm/°C.) | $4.3 \times 10^{-6}$ (Ave 50°–1000° C.) |

*8 wt. % $Y_2O_3$, 2 wt. % SrO and 90° wt. % $Si_3N_4$

Table II shows the results of thirteen different densified article compositions and their corresponding densified properties. These articles were all densified by the Nb encapsulation and HIP process. Each of these articles were fabricated using green-body articles having a composition of 0.5–6.0% (after decomposition from strontium carbonate) by weight of strontium oxide, 1.8 to 12.0% by weight yttrium oxide and the balance silicon nitride. The starting material for strontium oxide is strontium carbonate at a weight percentage of from 0.7–8.6%. Strontium carbonate is utilized in order to stabilize the sintering aid in the green forming stage and thereby retain the integrity of the article through densification of the final silicon nitride material.

TABLE II

| DENSIFIED ARTICLE COMPOSITION AND STRENGTH (Nb Encapsulation/HIP) | | | | |
|---|---|---|---|---|
| Composition | | | | |
| $Si_3N_4$ (Wt. %) | $Y_2O_3$ (Wt. %) | SrO (Wt. %) | Density, (g/cc) | Average Flexure strength, MPa (KSI) (22° C./1232° C./1400° C.) |
| 92 | 7 | 1 | * | */*/* |
| 91 | 8 | 1 | 3.30 | 554.0/584.3/598.7 (80.4)/(84.8)/(86.9) |
| 91 | 7 | 2 | 3.30 | 785.5/643.5/559.5 (114.0)/(93.4)/(81.2) |

TABLE II-continued
DENSIFIED ARTICLE COMPOSITION AND STRENGTH
(Nb Encapsulation/HIP)

| Composition | | | Density, (g/cc) | Average Flexure strength, MPa (KSI) (22° C./1232° C./1400° C.) |
|---|---|---|---|---|
| $Si_3N_4$ (Wt. %) | $Y_2O_3$ (Wt. %) | SrO (Wt. %) | | |
| 90.7 | 7.7 | 1.6 | 3.30 | 701.4/624.9/662.1 (101.8)/(90.7)/(96.1) |
| 90 | 9 | 1 | 3.32 | 514.0/487.1/558.1 (74.6)/(70.7)/(81.0) |
| 90 | 8 | 2 | 3.31 | 889.5/706.3/580.8 (129.1)/(102.5)/(84.3) |
| 90 | 7 | 3 | 3.31 | 853.0/535.4/ * (123.8)/(77.7)/* |
| 89.7 | 8.7 | 1.6 | 3.32 | */*/* |
| 89.7 | 7.7 | 2.6 | 3.31 | 837.1/ * / * (121.5)/ * / * |
| 89 | 10 | 1 | * | */*/* |
| 89 | 9 | 2 | 3.32 | 722.8/668.3/626.3 (104.9)/(97.0)/(90.9) |
| 89 | 8 | 3 | 3.32 | 673.2/535.4/465.1 (97.7)/(77.7)/(67.5) |
| 89 | 7 | 4 | * | */*/* |

*Not available

Green-body articles having a composition in the range given above can be densified in one of two ways. The first process requires an encapsulant while the second does not, each process can be used for near net shape forming of articles.

The first densification process is referred to as the encapsulation/hot isostatic pressing (HIP) process and comprises the steps of mixing the three constituents having the desired particle size by milling or other techniques. The mixed material is formed into the desired shape either by cold isostatic pressing, uniaxial die-pressing, injection molding, compression molding, extrusion or slip casting. In the case of cold isostatic pressing the milled ceramic powder is placed within a rubber die (or a polymeric envelope) and subjected to pressures of 275.6-413.4 Mpa (40-60 KSI) at room temperature. In the case of uniaxial pressing the ceramic powder (with or without a small amount of organic binder) is compressed to high pressure 17.2-68.9 MPa (2.5-10.0 KSI) in a metal die. In the case of injection molding, compression molding or extrusion, an organic binder at an appropriate percentage is blended with the ceramic powder to form a molding feed stock (or molding mix) and the molded into a shaped article using an injection molder, compression molder or extruder. The organic binder in the article is subsequently removed by an appropriate thermal cycle. In the case of slip casting, the milled ceramic powder is dispersed in water with the aid of a dispersant to form a low viscosity slurry or slip. This slip is then cast into a mold to form the shaped article, which will be dried prior to further processing. The formed green body, by any one of the above processes, is heated in a vacuum at 1100°-1250° C. for 3-10 hours. The heating step results in the decomposition of the strontium carbonate to the strontium oxide. Thereafter, the formed green body is cooled to room temperature while still in the vacuum in order to protect the green body from contact with moisture. The green body is then enclosed in an encapsulant (metal can or glass) while remaining under the vacuum. Once sealed within the encapsulant, the green body is subjected to temperatures of approximately 1600°-1900° C. and pressure of 10.3-206.7 MPa (1.5-30 KSI) for 1 to 8 hours in an inert atmosphere. Thereafter, the densified article is allowed to cool to room temperature.

The flexural strengths of thirteen compositions from within the specified range, densified by the Nb encapsulation/HIP method have already been listed in Tables I and II. One of the thirteen compositions (8 wt. % $Y_2O_3$, 2 wt. & SiO, and 90 wt. % $Si_3N_4$), was also densified by the glass encapsulation/HIP method, which is a near-net-shape process. The strength of this material approaches that of the material densified by the Nb encapsulation/HIP method (Table I). Table III shows the flexural strength as well as other properties of the glass encapsulated/HIP'ed material.

TABLE III
SILICON NITRIDE*
(Densified by Glass Encapsulation/HIP Process)
TYPICAL PROPERTIES

| | | |
|---|---|---|
| Density | 3.31 g/cc | |
| Flexure Strength (4 pt.) | | |
| 22° (72° F.) | 798 Mpa (115.8 ksi) | |
| 1232 (2250° F.) | 652 MPa (94.6 ksi) | |
| 1399 (2550° F.) | 471 MPa (68.4 ksi) | |
| Weibull modulus | 13 | |
| Fracture Toughness (Chevron Notch) | | |
| 22° C. (72° F.) | 6.05 MPa M ½ (5.51 ksi in ½) | |
| Young's Modulus | 306 GPa (44.3 Msi) | |
| Shear Modulus | 120 GPa (17.4 MSi) | |
| Stress Rupture Life (4 pt.) | | |
| 1204° C. (2200° F.) | 482.3 MPa (70 KSI) | 150 hr |
| 1260° C. (2300° F.) | 344.5 MPa (50 KSI) | 230 hr |
| 1260° C. (2300° F.) | 413.4 MPa (60 KSI) | 100 hr |
| 1371° C. (2500° F.) | 206.7 MPa (30 KSI) | 90 hr |
| Thermal Expansion Coefficient | | |
| 50-1000° C. | 4.3 × 10-6/C | |

*2 wt. % SrO, 8 wt. % $Y_2O_3$ and 90 wt. % $Si_3N_4$

The second densification process is referred to as the sinter/hot isostatic pressing (Sinter/HIP) process and as stated does not require an encapsulant and is better suited to forming near net shape articles economically. With this process, the shaped green body can be formed by the methods described above, i.e. slip casting, injection or compression molding, cold isostatic pressing; etc. and vacuum heat treated to decompose the strontium carbonate to strontium oxide while removing the carbon dioxide.

The shape green body is then placed in a crucible or container and buried in a mixture of powders of silicon nitride ($Si_3N_4$), yttrium oxide ($Y_2O_3$), aluminum oxide ($Al_2O_3$) and boron nitride (BN). The crucible is then placed in a furnace and heated in nitrogen atmosphere at a temperature in the range of 1800°-1900° C. and pressure in the range of approximately 0.7-2.1 MPa (100-300 psi) for 2 to 6 hours. Thereafter, the pressure is increased to a pressure in the range of approximately 10.3-206.7 MPa (1.5-30 KSI) for a period of 1 to 8 hours. Following the Sinter/HIP process, the article is allowed to cool to atmospheric conditions.

Table IV shows net shape articles which have been formed by a variety of green-forming processes; slip casting, injection molding or cold isostatic pressing, and densified utilizing either the encapsulation/HIP or sinter/HIP process. As disclosed, the final net shape articles can range from a simple billet to a complex shaped turbocharger turbine rotor which includes a wide variation of cross-sectional sizes.

TABLE IV

| Shape | Green Forming Process | Densification Process | Density (g/cc) |
|---|---|---|---|
| Billets | Cold Isostatically pressed | Metal can & glass encapsulated/HIP | 3.30–3.31 |
| Test bars | Injection Molded | Sinter/HIP glass encapsulation/HIP | 3.27–3.31 |
| Turbocharger Turbine Wheels | Slip Cast | Glass encapsulated/HIP | 3.28–3.30 |
| Stator vanes | Injection Molded | Glass encapsulated/HIP | 3.27–3.30 |
| Plates | Slip Cast | Glass encapsulated/HIP and Sinter/HIP | 3.29–3.31 |

It is presently believed that the materials used, herein i.e. silicon nitride, yttrium oxide, and strontium carbonate reduced to strontium oxide, when mixed within the specified weight percentages, and densified according to the described processes, combine to form a grain boundary composition having superior flexure strength and adhesion to the silicon nitride grains. In particular, mixtures having bulk compositions of 89–91 weight % silicon nitride, 7–10 weight % Yttrium oxide and 1–3 weight % strontium oxide have been processed and bulk flexure strengths from 560 to 662 MPa at 1400° C. have been observed.

While a number of specific test compositions, processes and near net shape articles have been set forth and described, it is understood that these are provided by way of example only and that various changes and modifications may be made therein without departing from the scope of the invention as defined by the appended claims:

What is claimed is:

1. A densified silicon nitride article consisting essentially of 0.5–6.0% strontium oxide, by weight, formed by the in situ decomposition of strontium carbonate, 2–12% yttrium oxide by weight and the balance silicon nitride; wherein said article is characterized by having an average flexure strength of greater than about 465 MPa at 1400° C.

2. The article of claim 1 wherein said article has an average mechanical flexure strength of 888.8 MPa (129 KSI) at 21° C. (70° F.) and 585.7 MPa (84.3 KSI) at 1399° C. (2,550° F.).

3. The article of claim 1 made by the steps of:
mixing 0.7–8.6% strontium carbonate by weight, 1.9–12.0% yttrium oxide by weight and the balance silicon nitride;
forming the desired green body shape;
decomposing said strontium carbonate to strontium oxide; and
encapsulating/hot isostatically pressing the green body shape to form the densified silicon nitride article.

4. The article of claim 3 wherein said step of forming is preformed by one of the following processes: cold isostatic pressing, extrusion, uniaxial die pressing, injection molding or slip casting the desired shape.

5. The article of claim 3 wherein said step of encapsulating comprises coating with a glass the green-body shape.

6. The article of claim 3 wherein said step of encapsulating comprises enclosing the green-body shape in a metal can and sealing said can.

7. The article of claim 3 wherein said step of hot isostatically pressing comprises heating the encapsulated green body shape to 1600°–1900° C. and isostatically pressing said shape at 10.3–206.7 MPa (1.0–30 KSI) for 1 to 8 hours.

8. The article of claim 1 made by the steps of:
mixing by weight 0.7–8.6% strontium carbonate, 1.9–12.0% yttrium oxide and the balance silicon nitride;
forming a shaped green-body of said mixture;
decomposing said strontium carbonate to strontium oxide;
sintering said green body to form a sintered body; and
hot isostatically pressing said sintered body to form the densified article.

9. The article of claim 8 wherein said steps of sintering and hot isostatic pressing art the steps of:
burying in a crucible said green body shape in a mixture of powders of silicon nitride, yttrium oxide, aluminum oxide and boron nitride; and
heating said green body in a nitrogen atmosphere at temperatures in the range of 1800°–1900° C. at pressures of 0.7–2.1 MPa (100–300 psi) for 2 to 6 hours.

10. The article of claim 8 wherein said step of hot isostatically pressing comprises:
isostatically pressing said body at 10.3–206 MPa (1.5–30 KSI) for 1 to 8 hours.

11. The article of claim 1 made by the steps of:
mixing by weight 0.7–8.6% strontium carbonate 1.9–12.0% yttrium oxide and the balance silicon nitride;
forming a shaped green-body of said mixture;
sintering said green body to form a sintered body; and
hot isostatically pressing said sintered body to form the densified article.

12. The article of claim 11 wherein said step of sitnering comprises the steps of:
burying in a crucible said green body in a mixture of powders of silicon nitride, yttrium oxide, aluminum oxide and boron nitride; and
heating said green body in an inert atmosphere at temperatures in the range of 1800°–1900° C. at pressures of 0.7 –2.1 MPa (100–300 psi) for 2 to 6 hours.

13. The article of claim 11 wherein said step of hot isostatically pressing comprises:
isostatically pressing said body at 10.3–206.7 MPa (1.5–30 KSI) for 1 to 8 hours.

14. A silicon nitride based green body consisting essentially of a mixture of 0.7–8.6% strontium carbonate by weight, 1.9–12.0% yttrium oxide and the balance silicon nitride plus an organic binder.

* * * * *

UNITED STATES PATENT AND TRADEMARK OFFICE
CERTIFICATE OF CORRECTION

PATENT NO. : 4,870,036

DATED : September 26, 1989

INVENTOR(S) : Hun C. Yeh

It is certified that error appears in the above-identified patent and that said Letters Patent is hereby corrected as shown below:

Title page:

Appearing in the Abstract, second to last line, the word "encapsulated" should read, -- unencapsulated --.

Signed and Sealed this

Sixth Day of November, 1990

Attest:

HARRY F. MANBECK, JR.

*Attesting Officer*          *Commissioner of Patents and Trademarks*